United States Patent
Liang et al.

(10) Patent No.: US 11,646,802 B2
(45) Date of Patent: May 9, 2023

(54) POLARIZATION INDEPENDENT OPTICAL RECEIVER

(71) Applicant: HEWLETT PACKARD ENTERPRISE DEVELOPMENT LP, Houston, TX (US)

(72) Inventors: Di Liang, Santa Barbara, CA (US); Zhihong Huang, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 88 days.

(21) Appl. No.: 16/891,008

(22) Filed: Jun. 2, 2020

(65) Prior Publication Data
US 2021/0376933 A1   Dec. 2, 2021

(51) Int. Cl.
*H04B 10/2507* (2013.01)
*H04B 10/61* (2013.01)

(52) U.S. Cl.
CPC ..... *H04B 10/6151* (2013.01); *H04B 10/2572* (2013.01)

(58) Field of Classification Search
CPC .......................... H04B 10/614; H04B 10/6151
See application file for complete search history.

(56) References Cited

U.S. PATENT DOCUMENTS

| | | | |
|---|---|---|---|
| 4,900,917 A | 2/1990 | Dixon et al. | |
| 5,502,783 A | 3/1996 | Wu | |
| 7,002,733 B2* | 2/2006 | Dagenais | H04B 10/2914 359/344 |
| 8,538,277 B2* | 9/2013 | Nagarajan | G02B 6/12009 398/203 |
| 8,964,284 B2* | 2/2015 | Ziari | H04B 10/2914 359/344 |
| 9,329,337 B2 | 5/2016 | Kato et al. | |
| 11,022,811 B2* | 6/2021 | Akiyama | G02B 27/283 |
| 11,437,786 B2* | 9/2022 | Fish | H01S 5/5009 |
| 2016/0209593 A1 | 7/2016 | Jiang | |
| 2017/0279539 A1* | 9/2017 | Tanaka | H04J 14/0254 |
| 2020/0213011 A1* | 7/2020 | Tanaka | H04B 10/0779 |

OTHER PUBLICATIONS

Ciaramella, E.; "Polarization-Independent Receivers for Low-Cost Coherent OOK Systems"; IEEE Photonics Technology Letters; Mar. 15, 2014; pp. 548-551; vol. 26; issue 6; IEEE.

Nikoufard, M. et al.; "An 8×20 GHz polarization independent WDM receiver"; Proceedings Symposium IEEE/LEOS Benelux Chapter, 2003; pp. 153-156.

* cited by examiner

*Primary Examiner* — Jai M Lee
(74) *Attorney, Agent, or Firm* — Sheppard Mullin Richter & Hampton LLP

(57) ABSTRACT

Systems and methods are provided for receiving an optical signal from an optical fiber, including: coupling via an optical coupler the optical signal from an optical fiber into first and second waveguides, wherein the optical signal comprises TE and TM polarized optical signals and the optical coupler couples the TE polarized optical signal into the first waveguide and the TM polarized optical signal into the second waveguide; equalizing the TE and TM polarized optical signals from the coupler to equalize optical power levels of the TE and TM polarized optical signals; optically combining the equalized TE and TM polarized optical signals; and transmitting the combined optical signal to a photodetector.

18 Claims, 5 Drawing Sheets

US 11,646,802 B2

POLARIZATION INDEPENDENT OPTICAL RECEIVER

STATEMENT OF GOVERNMENT RIGHTS

This invention was made with Government support under Agreement Number H98230-19-3-0002. The Government has certain rights in the invention.

DESCRIPTION OF RELATED ART

Silicon Photonics enables large scale integration of Dense Wavelength Division Multiplexing (DWDM) optical links for large distances (e.g., 2 km to 10 km),. At the receiver, waveguide photodetectors (e.g., SiGe (Silicon Germanium) detectors) can decouple the device bandwidth and speed, enabling high bandwidth (e.g., >40 GHz) while maintaining high responsivity. However, coupling to the waveguide detectors involves either a grating coupler or an edge coupling.

For the ease of wafer-level testing and cost-effective packaging, grating couplers are a popular choice for inputs and outputs (I/O), particularly for silicon photonic chips. But in general, grating couplers are polarization dependent. For a grating coupler designed for Transverse Electric (TE) polarized light, there may be a huge optical loss for the counterpart Transverse Magnetic (TM) polarized light even at the same wavelength.

While the optical signal from the light source (e.g., diode lasers in general) is TE polarized, its polarization is not preserved in a conventional optical fiber. Consequently, at the receiver, the original TE-polarized optical signal becomes a mixture of TE and TM-polarized light. The TM portion of the received signal will be wasted if the grating coupler in the receiver end is designed for TE polarization, and vice versa.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments disclosed herein may include a two-dimensional (2D) grating coupler that is polarization independent and can simultaneously couple both the TE and the TM portions of an incoming optical signal into two waveguides, separately, such as in two coherent streams. The two coherent streams of signals may be combined in a 2×1 optical combiner, which may be implemented, for example, as a multi-mode interferometer (MMI), Y-junction or other optical combiner. The combined optical signal can then be sent to a photodetector so that the optical signal can be converted to an electrical signal.

Embodiments may include amplification for the TE and TM signal paths to boost the optical signals prior to combining them. In some embodiments, the amplification can be provided in the form of an equalizer to ensure that both signals are at the same signal strength at the input to the combiner. In further embodiments, the equalizer can amplify or attenuate either signal to equalize the signal strength to optimize performance of the optical combiner.

Because of the spectral bandwidth of the grating coupler and optical combiner in various embodiments, multiple signals with different wavelengths can be received simultaneously. Embodiments may further include a demultiplexer to separate the received signal into its constituent parts, such as for a wavelength division multiplexed (WDM) signal. Individual photodiodes can be provided for each optical channel in a WDM system.

Figure 1:
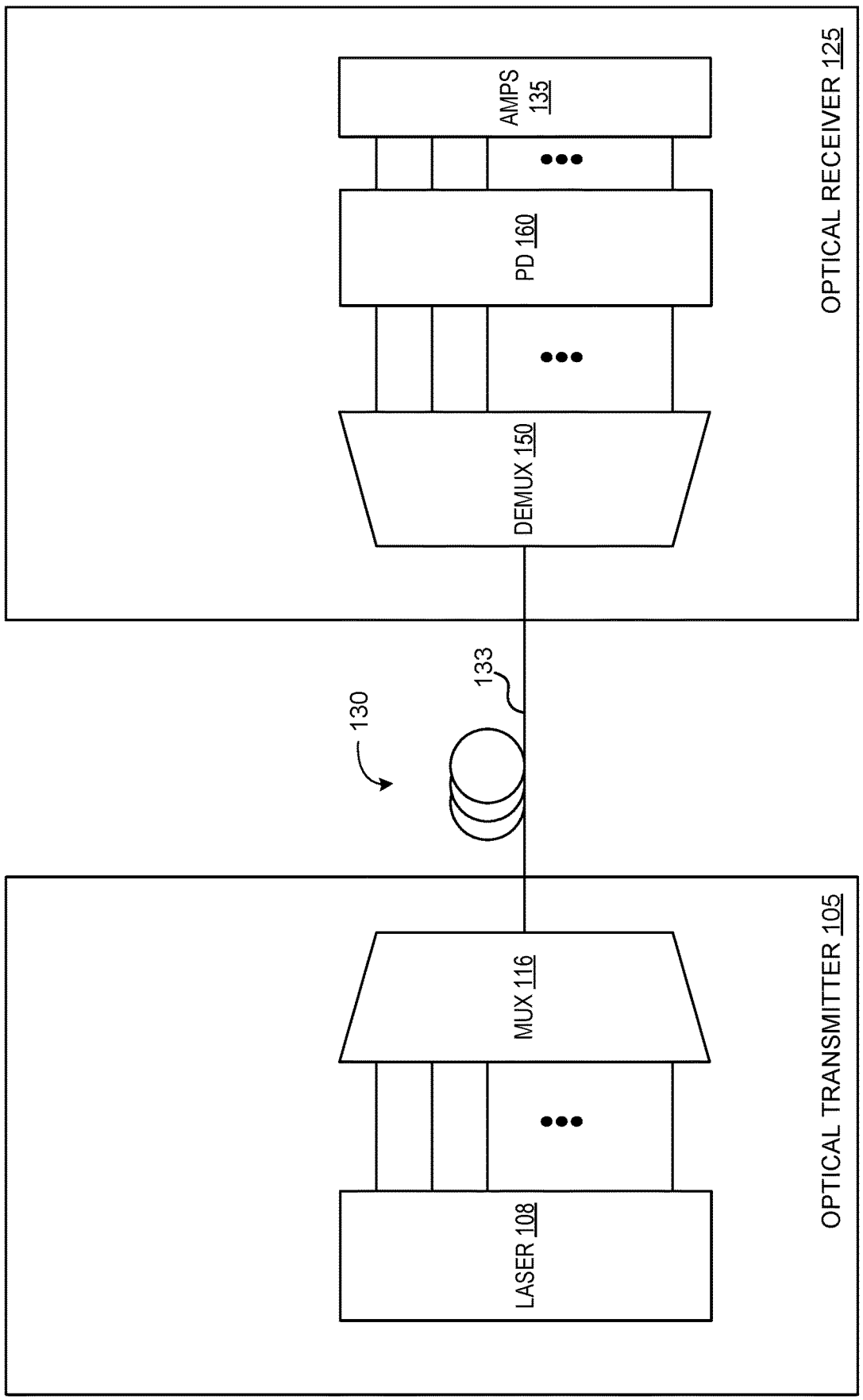
FIG. 1 is a diagram illustrating an example optical communication system with which embodiments may be implemented.

Before describing example embodiments in detail, it is useful to discuss one example application with which these and other embodiments may be implemented. FIG. 1 is a diagram illustrating an example optical communication system with which embodiments may be implemented. Referring now to FIG. 1, the example system includes an optical transmitter 105, an optical receiver 125 and an optical fiber communication link 130. This example optical transmitter 105 includes a transmit laser 108 to transmit data using an optical signal. In some embodiments, laser direct modulation can be used in which an IC driver can be provided to apply a modulated electrical signal to the laser to convert the electrical signal into an optical signal. In other embodiments, a continuous wave (CW) laser can be used and an optical modulator provided at the output of the laser to modulate the optical signal with the data.

The output of optical transmitter 105 is coupled to optical fiber 133 of the optical fiber communication link 130 via an optical coupler (not shown). At the receiving end, optical receiver 125 includes an optical coupler (e.g., as described in more detail below with respect to embodiments of FIGS. 2-4) to couple light from optical fiber 133 into a waveguide of optical receiver 125. Although the described example uses a waveguide receiver, the receiver may also be implemented using discrete components. A photodetector 160 (e.g., one or more photodiodes) may be included to detect the optical signal and convert it into an electrical signal for processing or storage. The current output from the photodiodes can be provided to their corresponding amplifiers 135, which may be implemented, for example, as transimpedance amplifiers. Although not illustrated, optical receiver 125 may also include for each channel a variable gain amplifier, equalization circuits (continuous time linear equalization and/or decision feedback equalization), a slicer (comparator), and so on. A more complex receiver may also include an analog to digital converter and a processor, such as a digital signal processor.

The example optical communication system may be implemented as a wavelength division multiplex (WDM) system capable of multiplexing and transmitting multiple channels of information across a single signal path (e.g., a single fiber 133). Accordingly, the communication system may include multiple lasers 108 and multiple photodetectors 160. Each laser 108 in the WDM system may be configured to produce a light signal at a designated wavelength, each of which may be referred to as a channel in the WDM system. The lasers 108 may include any of a number of different types of lasers including, for example, Vertical-Cavity Surface-Emitting Lasers (VCSELs), Distributed Bragg Reflex Lasers (DBRs), Distributed Feedback Lasers (DFBs), and other semiconductor lasers. In some embodiments, a comb laser may be used to provide a frequency comb, each wavelength of which may be modulated, for example, using an optical modulator for each frequency line. The WDM system may also include a multiplexer 116 to multiplex the multiple light signals from the lasers into a WDM optical signal. In WDM embodiments, modulation may occur individually for each channel (i.e., for each light source) such that each channel can carry different information. The multiplexed channels can then be launched onto optical fiber 133. At optical receiver 125, the WDM signal may be demultiplexed using a demultiplexer 150 (e.g., as described in more detail below with respect to FIGS. 3-4) to separate the WDM signal into its individual channels and each channel provided to its respective photodetector of multiple photodetectors 160.

In various implementations such as a silicon photonics application, the optical signals can be propagated through planar waveguide structures fabricated on a substrate. One example planar waveguide that may be used is a slab waveguide. The optical signals propagate within a planar slab of relatively high index material that is surrounded by a cladding having a lower index of refraction. A core/cladding interface exists at the boundary between the core region and the cladding region such that when light in the core region is incident upon this core/cladding interface at an angle greater than the critical angle, the light is reflected back into the core region. This serves to confine the light within the slab waveguide by total internal reflection, but some optical energy may exist within the cladding region outside the core. This is often referred to as evanescent energy or an evanescent field. The slab waveguide may be configured to carry a plurality of independent optical signals by providing ribs, ridges, strips or like structures extending along a side of the slab. The optical energy propagating within the slab may localized to different regions within the slab as defined by these structures.

Waveguides can be fabricated in a wide variety of geometries and configurations. A channel waveguide, such as a buried channel or embedded strip waveguide may generally include a core of relatively high index material that is surrounded by a cladding having a lower index of refraction. The substrate may form at least part of the surrounding cladding region.

A ridge or rib waveguide may also be used, and may be formed by depositing material on or removing material from (or both) selected regions of the slab, resulting in thickness variations in the slab waveguide. A strip-loaded waveguide may be formed by depositing a strip of material on the slab. The strip may have a refractive index that is greater than that of the cladding layers, but it may be approximately equal to that of the slab. The strip may be included to induce an increase in the effective index of the slab in the region proximate the strip. Although various integrated waveguide examples are provided, as noted above, in some implementations the receiver may be implemented using discrete components.

The couplers may be implemented as grating couplers having a flared waveguide portion with a relatively narrow end portion to engage the waveguide expanding to a wider end portion to couple to the fiber. The flared portion includes elongate scattering elements positioned to couple light between the coupler and an optical fiber or other optical element.

The communication system illustrated in and described above with respect to FIG. 1 is only one example of a communication system with which embodiments may be implemented. Embodiments may be implemented with any of a number of other optical communication systems.

Figure 2:
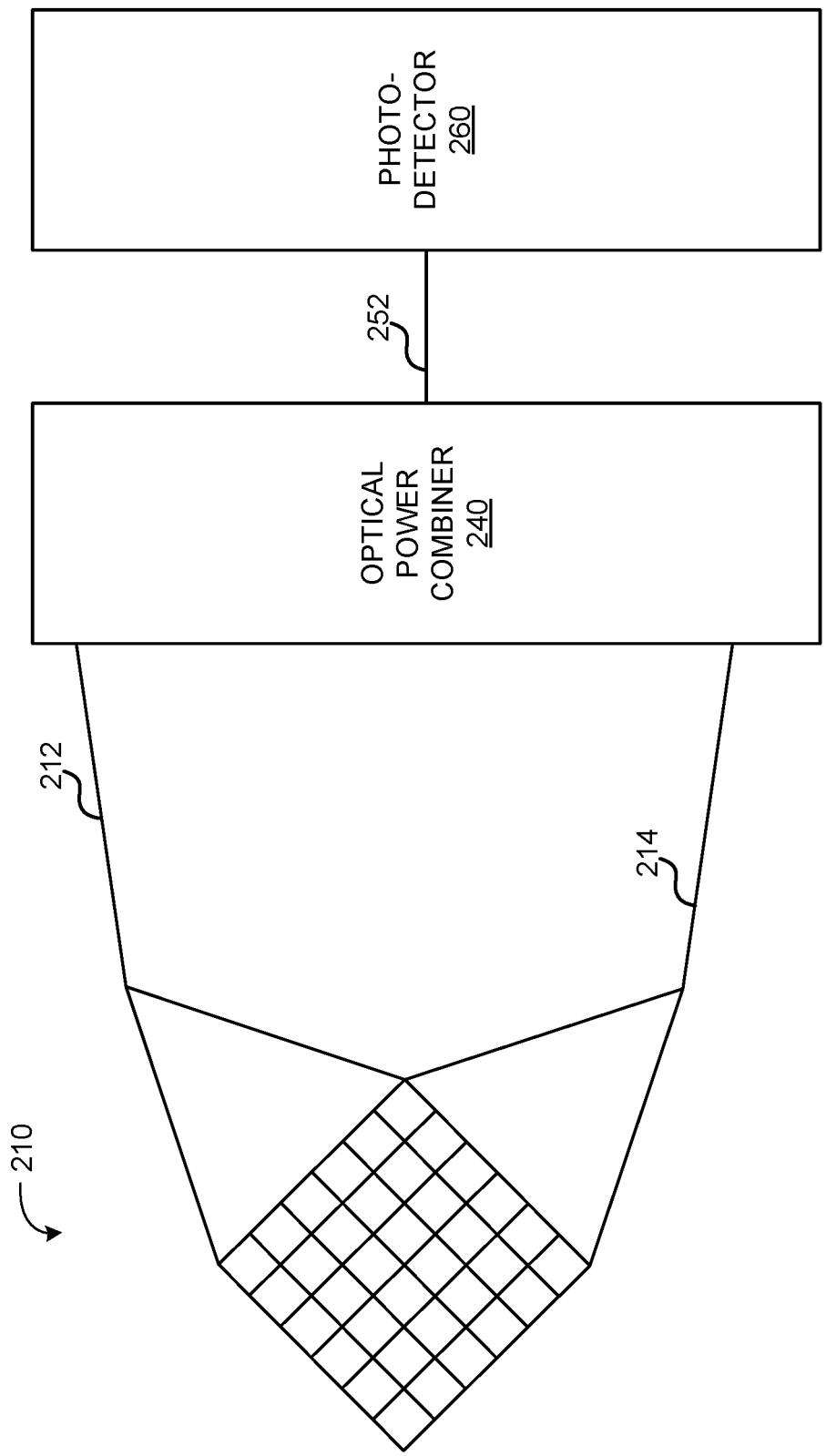
FIG. 2 illustrates an example optical receiver in accordance with various embodiments.

FIG. 2 illustrates an example optical receiver in accordance with various embodiments. This example includes an optical coupler implemented in the form of a grating coupler 210, an optical power combiner 240 and a photodetector 260. Grating coupler 210 may be included to couple the input optical signal (e.g., from optical fiber 133 in the example of FIG. 1) onto a waveguide or other structure of a photonics integrated circuit. Grating coupler 210 may be fabricated on the same integrated circuit as other components of the receiver circuit.

Grating coupler 210 may be implemented as a polarization independent grating coupler so that it is configured to receive and couple both TE and TM polarized optical signals. Grating coupler 210 may include a plurality of gratings formed as part of the grating coupler that may be uniformly or non-uniformly spaced with respect to one another. The gratings can be formed as part of a waveguide layer on a suitable substrate such as, for example, on a silicon dioxide ($SiO_2$) or buried oxide (BOX) insulating layer deposited on a silicon (Si) substrate layer. In other applications, other chemistries may be used to form the photonics integrated circuit including, for example, gallium arsenide.

The gratings may be formed in the waveguide core of the coupler by etching and filling techniques. The waveguide layer may be sandwiched between upper and lower confining layers having a refractive index lower than the refractive index of the waveguide core layer to thereby achieve a total internal reflection condition. The gratings of grating coupler 210 can include multiple gratings including one or more gratings having a grating period optimized for TM polarization and one or more gratings having a grating period optimized for TE polarization, with polarization periods of $\Lambda_{TM}$ and $\Lambda_{TE}$, respectively. Grating coupler 210 may be configured to divide the input signal into two orthogonally polarized signals (TE, TM), which may then propagate along their respective waveguides 212, 214. The optical fiber (e.g., optical fiber 133) can be butt coupled to the grating coupler 210 using conventional butt coupling techniques.

Optical power combiner 240 receives the TE and TM optical signals from their respective waveguides 212, 214 combines these into a single optical signal. Optical power combiner 240 outputs the single optical signal onto waveguide 252 where it is transmitted to photodetector 260. Utilizing both the TE and the TM streams combined into one can reduce or minimize optical power loss that is otherwise due to mixed polarization of the incoming light. Photodetector 260 may be implemented, for example, using a photodiode such as an avalanche photodiode. The avalanche photodiode may be operated in a reverse bias condition to enable avalanche multiplication of holes and electrons created by the impact of photons from the optical signal from waveguide 252. When the crystal junction between the PN and layers of the device is illuminated by the incident photons, a current flows in proportion to the number of photons incident upon the junction. As photons enter the depletion region, they create hole-electron pairs, which are pulled by the high electric field in the device. As the bias voltage increases, electrons generated in the P layer increase in energy as they undergo multiple collisions with the crystalline silicon lattice. Accordingly, photodetector 260 outputs an electrical signal in proportion to the energy of the incoming optical signal.

Figure 3:
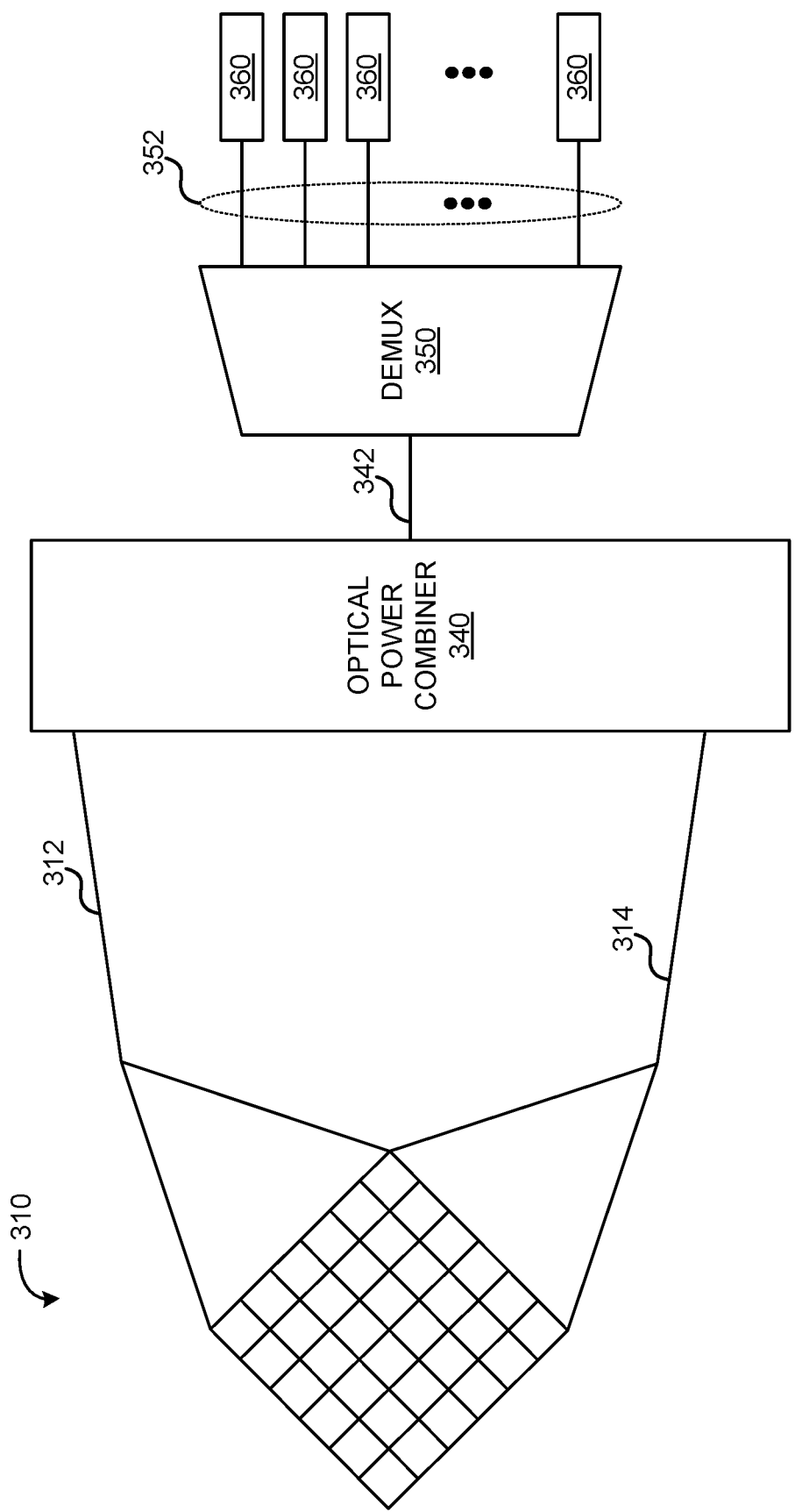
FIG. 3 is a diagram illustrating an example optical receiver for use in a WDM communication system in accordance with various embodiments.

FIG. 3 is a diagram illustrating an example optical receiver for use in a WDM communication system in accordance with various embodiments. Referring now to FIG. 3, this example is similar to the example of FIG. 2 in that it includes an optical coupler implemented in the form of a grating coupler 310, an optical power combiner 340 and a plurality of photodetectors 360. Grating coupler 310 may be included to couple the input optical signal (e.g., from optical fiber 133 in the example of FIG. 1) onto a waveguide or other structure of a photonics integrated circuit. In the illustrated example, Grating coupler 310 may be configured to divide the input signal into two orthogonally polarized signals (TE, TM), which may then propagate along their respective waveguides 312, 314. The optical fiber (e.g., optical fiber 133) can be butt coupled to the grating coupler 310 using conventional butt coupling techniques. Grating coupler 310 may be fabricated on the same integrated circuit as other components of the receiver circuit.

For use with a WDM system in which multiple channels are wavelength division multiplexed onto a single fiber, this example receiver also includes an optical demultiplexer 350. Optical power combiner 340 combines the TE and TM signals into a single optical signal and launches them along waveguide 342 to optical demultiplexer 350. Optical demultiplexer 350 receives the optical signal from optical power combiner 340 and separates the signal into its frequency components. Accordingly, the different wavelengths are separated onto different paths and sent via separate waveguides 352 to their respective photodetectors 360.

Figure 4:
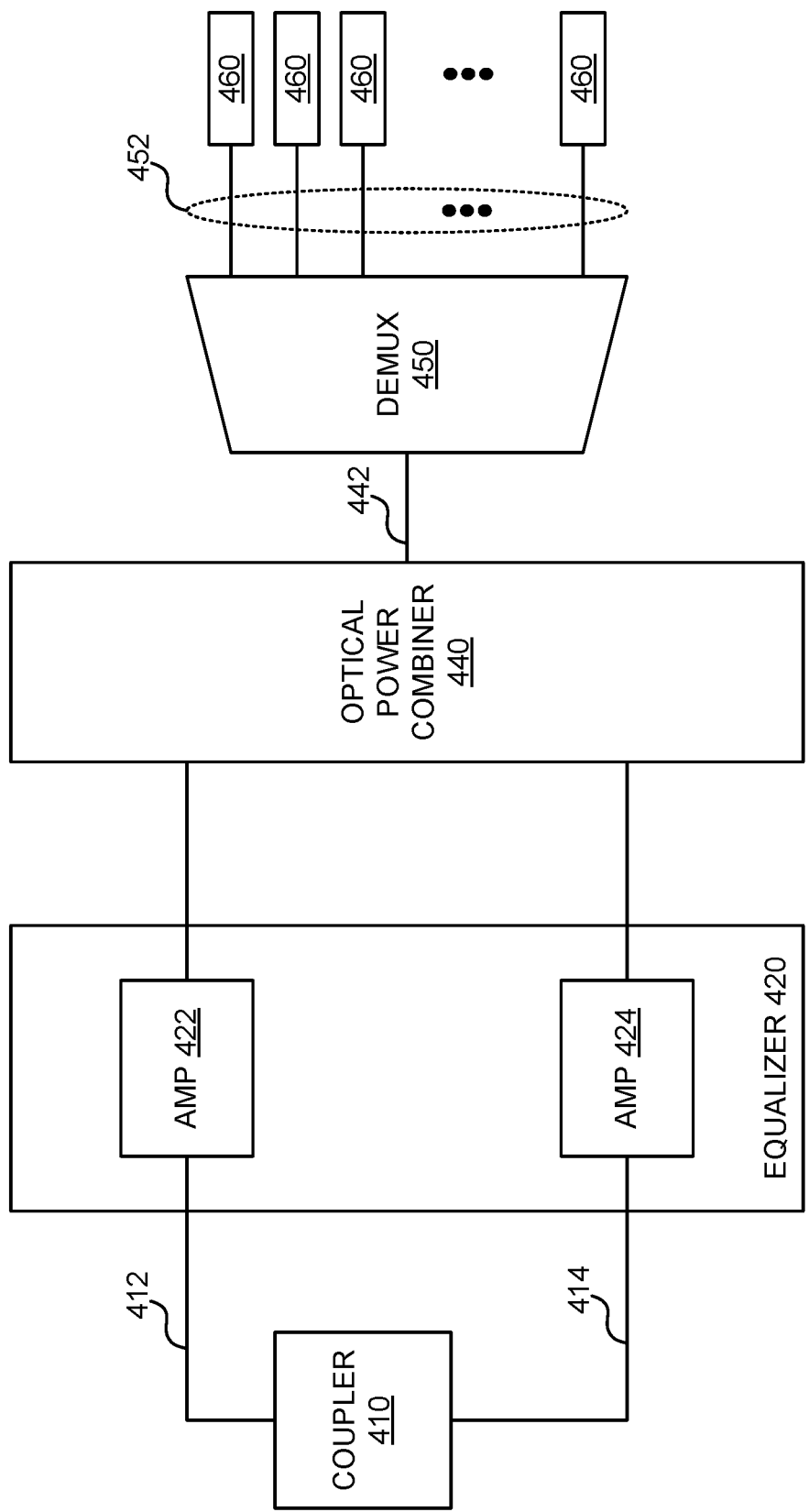
FIG. 4 is a diagram illustrating another example optical receiver for use in a WDM communication system in accordance with various embodiments.

FIG. 4 is a diagram illustrating another example optical receiver for use in a WDM communication system in accordance with various embodiments. Referring now to FIG. 4, this example includes an equalizer 420 in addition to a grating coupler 410, an optical power combiner 440, a demultiplexer 450, and a plurality of photodetectors 460. Grating coupler 410 may be configured to divide the input signal into two orthogonally polarized signals (TE, TM), which may then propagate along their respective waveguides 412, 414. Similar to the example of FIG. 3, the TE and TM signals can be combined by optical combiner 440 into a single combined signal and sent via waveguide 442 to optical demultiplexer 450 where the signal is separated into its constituent frequency components and sent via separate waveguides 452 to their respective photodetectors 460.

This example includes amplifiers 422, 424 to amplify the TE and TM signals prior to combining the signals at optical combiner 440. Accordingly, optical power combiner 440 may combine amplified TE and TM signals. Amplifying the TE and TM signals with amplifiers 422, 424 can provide signals with a higher optical power (e.g., in dBm or watts) for detection by photodetectors 460. Although some embodiments may use amplifiers such as amplifiers 422, 424 without equalization, the illustrated example includes equalization to ensure that the amplified TE and amplified TM signals sent to the combiner are within a predetermined acceptable range of one another (e.g., at about the same or similar optical power levels). This may lead to improved performance at optical power combiner 440. Accordingly, equalizer 420 can monitor the output power levels of amplifiers 422, 424 and adjust the amplifier gains to equalize the output optical power. In some embodiments, equalizer 420 may not only amplify either or both of the TE and TM signals but it may also be configured to attenuate either or both of the signals. This can help to provide equalization in circumstances where one of the signals cannot be raised to meet the level of the other signal or where one signal may have power levels beyond the dynamic range of the photodetectors.

Figure 5:
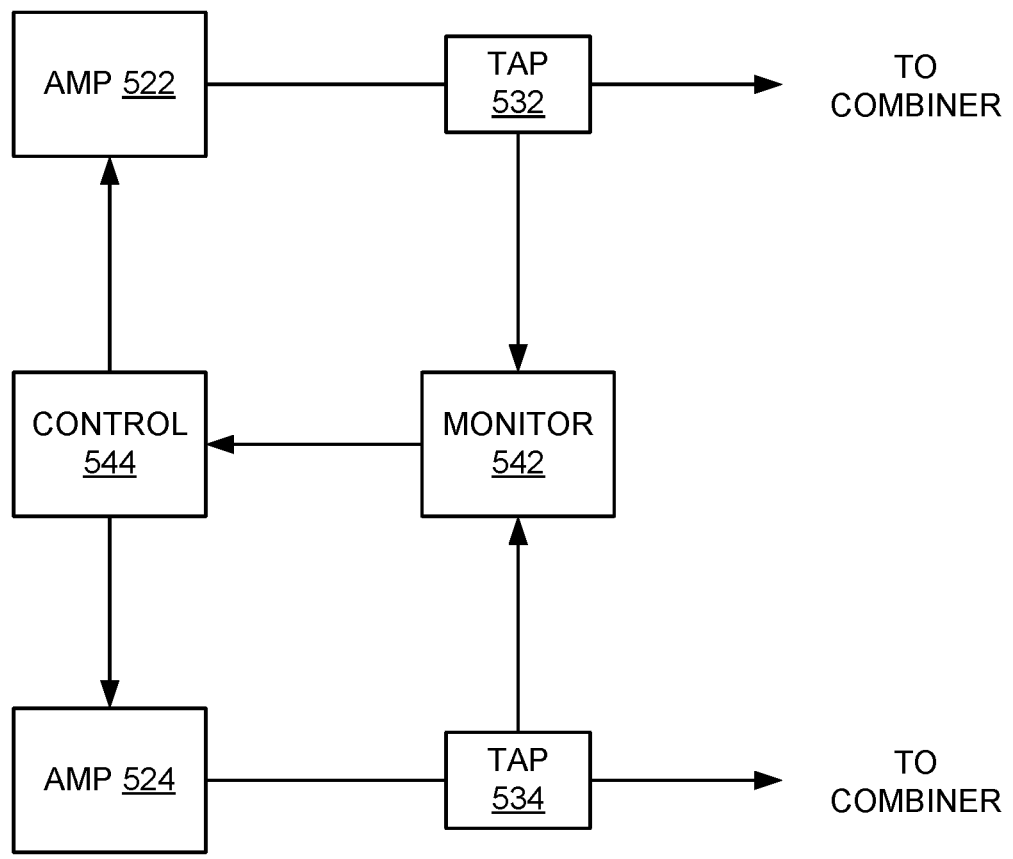
FIG. 5 is a diagram illustrating an example implementation of an equalizer in accordance with various embodiments.

FIG. 5 is a diagram illustrating an example implementation of an equalizer (e.g., equalizer 420) in accordance with various embodiments. The example illustrated in FIG. 5 includes optical amplifiers 522, 524, optical taps 532, 534, optical signal power monitor 542 and controller 544.

Optical taps 532, 534 may be configured to tap a small percentage of the optical signal out of each respective amplifier (i.e., a small percentage of the TE and TM optical signals). This may be on the order of 0.5 percent, 1%, 1.5 percent, 2%, 2.5%, or other small amount of the optical signal. Optical signal power monitor 542 receives and monitors the Portion of the TE and TM signals to monitor the optical power of each. Optical signal power monitor 542 can compare the optical signal power of the TE and TM optical signals and determine whether they are at the same or about the same optical power level or within a predetermined acceptable range of each other. In some embodiments, optical signal power monitor 542 may include, for example, a photodetector for each of the TE and TM signals, such as a photodiode for example, to detect the optical power level of the signals. The photodiodes may convert the detected tapped optical signal to a corresponding electrical signal that can be compared by a comparator or other comparison mechanism at optical signal power monitor 542.

If the optical power levels of the TE and TM optical signals are within the predetermined acceptable range, or at the same or about the same optical power level, the system may continue operating without adjustment. If, on the other hand, the optical signal power of the TE and TM optical signals are not at the same or about the same level, or not within a predetermined acceptable range, this information can provided to controller 544 which can use this information to control amplifiers 422 and 424 to equalize the optical output power.

Accordingly, controller 544 may be configured to adjust the gain of amplifiers 422 and 424 up or down as appropriate to equalize the optical output power of the TE and TM optical signals. In some embodiments, filters or other attenuators, such as optical lattice planar waveguide filters, may be provided to attenuate the optical output power. As a further example, a variable optical attenuator can be included on each leg to provide an adjustable amount of attenuation controllable by controller 544. Such a variable optical attenuator may be provided, for example, as a p-i-n electronic diode or a silicon photonic MEMS device. Accordingly, by independently controlling the gain or attenuation provided in each leg, the optical power levels may be equalized. It is noted that although amplifiers and equalization are described as being included in WDM applications, amplification and equalization are not limited to such applications.

Embodiments may also include fabricating a photonic integrated circuit in accordance with the disclosure set forth herein. In various embodiments, the method may include: fabricating an optical coupler as part of the integrated optical circuit, the optical coupler configured to receive an optical signal from an optical fiber, the optical signal comprising TE and TM polarized optical signals; fabricating a first waveguide coupled to an output of the coupler to receive the TE polarized optical signal from the coupler; fabricating a second waveguide coupled to an output of the coupler to receive the TM polarized optical signal from the coupler; fabricating a first amplifier coupled to receive the TE polarized optical signal from the coupler and to amplify the TE polarized optical signal to create an amplified TE polarized optical signal; fabricating a second amplifier coupled to receive the TM polarized optical signal from the coupler and to amplify the TM polarized optical signal to create an amplified TM polarized optical signal; fabricating an optical combiner comprising inputs coupled to the first and second amplifiers and configured to optically combine the amplified TE polarized optical signal with the amplified TM polarized optical signal; and fabricating a photodetector to receive the combined optical signal from the optical combiner and to convert the combined optical signal into a corresponding electrical signal.

The method of fabricating the photonic integrated circuit may further include fabricating a demultiplexer, the demultiplexer comprising an input coupled to an output of the optical combiner, the demultiplexer to receive the combined optical signal, to demultiplex the combined optical signal into frequency channels, and to provide each frequency channel to a corresponding photodiode of the plurality of a photodiodes.

The method of fabricating the photonic integrated circuit may further include fabricating an equalizer to equalize the amplified TE and TM polarized optical signals prior to combining at the optical combiner. The equalizer may include a feedback loop from each of the first and second amplifiers to compare an optical power level of the amplified TM polarized optical signal with an optical power level of the amplified TE polarized optical signal and to adjust a gain of at least one of the first and second amplifiers to equalize the amplified TE and TM polarized optical signals.

The terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

The terms "substantially" and "about" used throughout this disclosure, including the claims, are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An integrated optical receiver, comprising:
   an optical coupler configured to receive an optical signal from an optical fiber, the optical signal comprising TE and TM polarized optical signals;
   a first waveguide coupled to an output of the coupler to receive the TE polarized optical signal from the coupler;
   a second waveguide coupled to an output of the coupler to receive the TM polarized optical signal from the coupler;
   a first amplifier coupled to receive the TE polarized optical signal from the coupler and to amplify the TE polarized optical signal to create an amplified TE polarized optical signal;
   a second amplifier coupled to receive the TM polarized optical signal from the coupler and to amplify the TM polarized optical signal to create an amplified TM polarized optical signal;
   an equalizer configured to equalize the amplified TE and TM polarized optical signals prior to combining, wherein equalizing comprises selectively amplifying and selectively attenuating the amplified TE and TM polarized optical signals such that an optical power level of the amplified TE polarized optical signal and an optical power level of the TM polarized optical signal are equalized;
   an optical combiner comprising inputs coupled to the first and second amplifiers and configured to optically combine the equalized TE polarized optical signal with the equalized TM polarized optical signal; and
   a photodetector to receive the combined optical signal from the optical combiner and to convert the combined optical signal into a corresponding electrical signal.

2. The integrated optical receiver of claim 1, wherein the optical signal received at the optical coupler comprises a WDM signal, the WDM signal comprising a plurality of channels, wherein each channel is defined by a wavelength and the photodetector comprises a plurality of photodiodes; the integrated optical receiver further comprising:
   a demultiplexer comprising an input coupled to an output of the optical combiner, the demultiplexer to receive the combined optical signal, to demultiplex the combined optical signal into frequency channels, and to provide each frequency channel to a corresponding photodiode of the plurality of a photodiodes.

3. The integrated optical receiver of claim 1, wherein the first and second amplifiers are part of the equalizer, and the equalizer further comprises a feedback loop from each of the first and second amplifiers to compare the optical power level of the amplified TM polarized optical signal with the optical power level of the amplified TE polarized optical signal and to adjust a gain of at least one of the first and second amplifiers to selectively amplify to equalize the amplified TE and TM polarized optical signals.

4. The integrated optical receiver of claim 3, wherein equalizing the optical power levels of the amplified TE and TM polarized optical signals comprises adjusting at least one of the optical power levels such that the optical power levels of the amplified TE and TM polarized optical signals are within a predetermined range of one another.

5. The integrated optical receiver of claim 3, wherein the feedback loop comprises:
   a first tap to tap a portion of the optical power of the amplified TE polarized optical signal;
   a second tap to tap a portion of the optical power of the amplified TM polarized optical signal;
   a monitor to compare the tapped portion of the optical power of the amplified TE polarized optical signal with the tapped portion of the optical power of the amplified TM polarized optical signal; and
   a controller to adjust the gain of at least one of the first and second amplifiers to selectively amplify based on the comparison to equalize the amplified TE and TM polarized optical signals.

6. The integrated optical receiver of claim 5, wherein the feedback loop further comprises:
   a first photodetector coupled to receive the tapped portion of the optical power of the amplified TE polarized optical signal and to convert the TE polarized optical signal into a corresponding electrical signal; and
   a second photodetector coupled to receive the tapped portion of the optical power of the amplified TM polarized optical signal and to convert the TM polarized optical signal into a corresponding electrical signal;
   wherein comparing at the monitor the tapped portion of the optical power of the amplified TE polarized optical signal with the tapped portion of the optical power of the amplified TM polarized optical signal comprises comparing the electrical signal corresponding to the amplified TE polarized optical signal with the electrical signal corresponding to the amplified TM polarized optical signal.

7. The integrated optical receiver of claim 3, wherein the first and second amplifiers are part of the equalizer, and the equalizer further comprises:
   a first attenuator to selectively attenuate the amplified TE polarized optical signal;
   a second attenuator to selectively attenuate the amplified TM polarized optical signal; and
   a feedback loop from each of the first and second amplifiers to compare the optical power level of the amplified TM polarized optical signal with the optical power level of the amplified TE polarized optical signal and to adjust a gain of the first amplifier, a gain of the second amplifiers, an attenuation amount of the first attenuator and an attenuation amount of the second attenuator to selectively attenuate to equalize the amplified TE and TM polarized optical signals.

8. The integrated optical receiver of claim 1, wherein the coupler comprises a grating coupler.

9. A method of receiving an optical signal from an optical fiber, the method comprising:
   coupling via an optical coupler the optical signal from an optical fiber into first and second waveguides, wherein the optical signal comprises TE and TM polarized optical signals and the optical coupler couples the TE polarized optical signal into the first waveguide and the TM polarized optical signal into the second waveguide;
   equalizing the TE and TM polarized optical signals from the coupler to equalize optical power levels of the TE and TM polarized optical signals, wherein equalizing comprises selectively amplifying and selectively attenuating the TE and TM polarized optical signals;
   optically combining the equalized TE and TM polarized optical signals; and
   transmitting the combined optical signal to a photodetector.

10. The method of claim 9, wherein the optical signal received at the optical coupler comprises a WDM signal, the WDM signal comprising a plurality of channels, wherein each channel is defined by a wavelength, and wherein the photodetector comprises a plurality of photodiodes; the method further comprising demultiplexing the combined optical signal into a plurality of frequency channels, and providing each frequency channel to a corresponding photodiode of the plurality of a photodiodes.

11. The method of claim 9, wherein equalizing the TE and TM polarized optical signals comprises adjusting the optical power level of at least one of the TE and TM polarized optical signals such that the optical power levels of the TE and TM polarized optical signals are within a predetermined range of one another.

12. The method of claim 9, wherein equalizing comprises comparing the optical power level of the TM polarized optical signal with the optical power level of the TE polarized optical signal and at least one of: adjusting a gain of a first amplifier to control an amount of amplification for selectively amplifying the TE polarized optical signal; and adjusting a gain of a second amplifier to control an amount of amplification for selectively amplifying the TM polarized optical signal.

13. The method of claim 9, wherein equalizing comprises comparing the optical power level of the TM polarized optical signal with the optical power level of the TE polarized optical signal and at least one of: adjusting a gain of a first amplifier to control an amount of amplification for selectively amplifying the TE polarized optical signal; adjusting a gain of a second amplifier to control an amount of amplification for selectively amplifying the TM polarized optical signal; adjusting a first attenuator to control an amount of attenuation for selectively attenuating the TE polarized optical signal; and adjusting a second attenuator to control an amount of attenuation for selectively attenuating the TM polarized optical signal.

14. The method of claim 9, wherein equalizing the TE and TM polarized optical signals comprises:
   tapping a portion of the optical power of the TE polarized optical signal prior to combining;
   tapping a portion of the optical power of the TM polarized optical signal prior to combining;
   comparing the tapped portion of the optical power of the TE polarized optical signal with the tapped portion of the optical power of the TM polarized optical signal;
   adjusting a gain of a first amplifier to control an amount of amplification for selectively amplifying the TE polarized optical signal;
   adjusting a gain of a second amplifier to control an amount of amplification for selectively amplifying the TM polarized optical signal;
   adjusting a first attenuator to control an amount of attenuation for selectively attenuating the TE polarized optical signal; and
   adjusting a second attenuator to control an amount of attenuation for selectively attenuating the TM polarized optical signal.

15. The method of claim 14, further comprising:
   using a photodetector to convert the TE polarized optical signal to a corresponding electrical signal; and
   using a photodetector to convert the TM polarized optical signal to a corresponding electrical signal;

wherein comparing the tapped portion of the optical power of the TE polarized optical signal with the tapped portion of the optical power of the TM polarized optical signal comprises comparing the electrical signal corresponding to the TE polarized optical signal with the electrical signal corresponding to the TM polarized optical signal.

16. A method of fabricating an integrated optical circuit, the method comprising:
fabricating an optical coupler as part of the integrated optical circuit, the optical coupler configured to receive an optical signal from an optical fiber, the optical signal comprising TE and TM polarized optical signals;
fabricating a first waveguide coupled to an output of the coupler to receive the TE polarized optical signal from the coupler;
fabricating a second waveguide coupled to an output of the coupler to receive the TM polarized optical signal from the coupler;
fabricating a first amplifier coupled to receive the TE polarized optical signal from the coupler and to amplify the TE polarized optical signal to create an amplified TE polarized optical signal;
fabricating a second amplifier coupled to receive the TM polarized optical signal from the coupler and to amplify the TM polarized optical signal to create an amplified TM polarized optical signal;
fabricating an equalizer to equalize the amplified TE and TM polarized optical signals prior to combining, wherein equalizing comprises selectively amplifying and selectively attenuating at least one of the amplified TE and TM polarized optical signals such that an optical power level of the amplified TE polarized optical signal and an optical power level of the TM polarized optical signal are equalized;
fabricating an optical combiner comprising inputs coupled to the first and second amplifiers and configured to optically combine the equalized TE polarized optical signal with the equalized TM polarized optical signal; and
fabricating a photodetector to receive the combined optical signal from the optical combiner and to convert the combined optical signal into a corresponding electrical signal.

17. The method of claim 16, further comprising fabricating a demultiplexer, the demultiplexer comprising an input coupled to an output of the optical combiner, the demultiplexer to receive the combined optical signal, to demultiplex the combined optical signal into frequency channels, and to provide each frequency channel to a corresponding photodiode of a plurality of a photodiodes.

18. The method of claim 16, wherein the equalizer comprises a feedback loop from each of the first and second amplifiers to compare the optical power level of the amplified TM polarized optical signal with the optical power level of the amplified TE polarized optical signal and to adjust a gain of at least one of the first and second amplifiers to selectively amplify to equalize the amplified TE and TM polarized optical signals.

* * * * *